INVENTOR:
VINCENT G. TERRY, JR.
BY W. C. Crutcher
HIS ATTORNEY.

Feb. 11, 1969  V. G. TERRY, JR  3,427,488

TOP-HUNG RIVETED ROTOR END WINDING BLOCK

Filed Dec. 3, 1965

INVENTOR:
VINCENT G. TERRY, JR.
BY W. C. Crutcher
HIS ATTORNEY.

3,427,488
TOP-HUNG RIVETED ROTOR END
WINDING BLOCK
Vincent G. Terry, Jr., Beverly, Mass., assignor to
General Electric Company, a corporation of New
York
Filed Dec. 3, 1965, Ser. No. 511,538
U.S. Cl. 310—261                                    1 Claim
Int. Cl. H02k 1/22, 3/32

ABSTRACT OF THE DISCLOSURE

A spacer block for the end windings of a dynamoelectric machine rotor. The spacer has an attached flange extending between the rotor winding and the retaining ring to hold the spacer in place.

---

Figure 1:
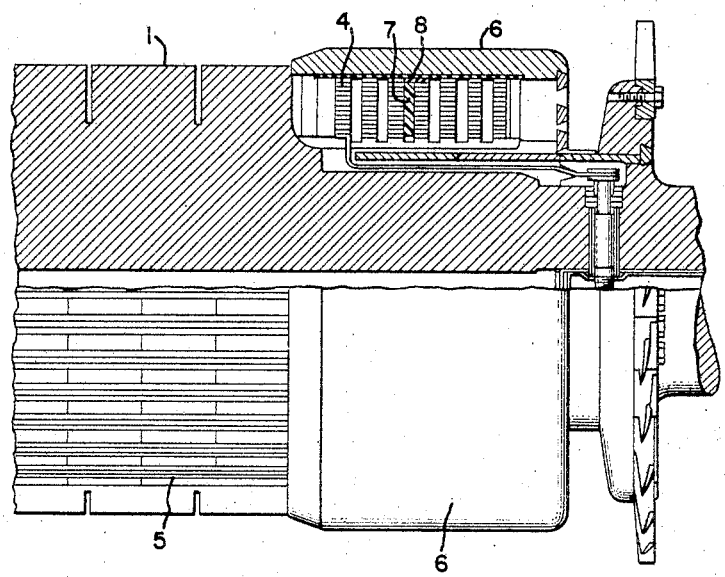

This invention relates generally to dynamoelectric machine rotors. More particularly it relates to the rotor end windings of dynamoelectric machines and blocks used for their separation and support.

The end windings of the rotor conductors of a dynamoelectric machine, as, for example, a generator, are subject to forces from temperature changes and from their high speeds which tend to distort them. Since the end windings are not firmly held and separated by the teeth and wedges of the rotor body as are the longitudinal conductors in the rotor central portion, they must be held and separated or blocked by other means. These blocking means must be as to prevent relative movement of the rotor conductor bars to avoid insulation damage, for example. Furthermore, they must be able to remain substantially fixed even when speed and temperature distortion of the windings cause the blockings to be loosely fit therebetween. Dielectric blocking for this purpose is not new to the art, but the prior art blockings have been of a relatively detailed design. Hence they are relatively expensive to produce and complicated to assembly on the rotor.

Accordingly, it is an object of this invention to provide a blocking for a generator end winding which is relatively simple, stable when in place, more economical to produce, and easily assembled on the rotor.

Other objects, advantages and features of this invention will become apparent from the following description of an embodiment thereof when taken in connection with the accompanying drawing.

Briefly stated, this invention comprises a dielectric block with a flange fastened to one end thereof to act as a hook. When the block is set between two conductors, it hangs from the flange and is prevented from dropping radially inwardly thereby. The retaining ring prevents it from flying radially outwardly, and from moving circumferentially.

Figure 2:
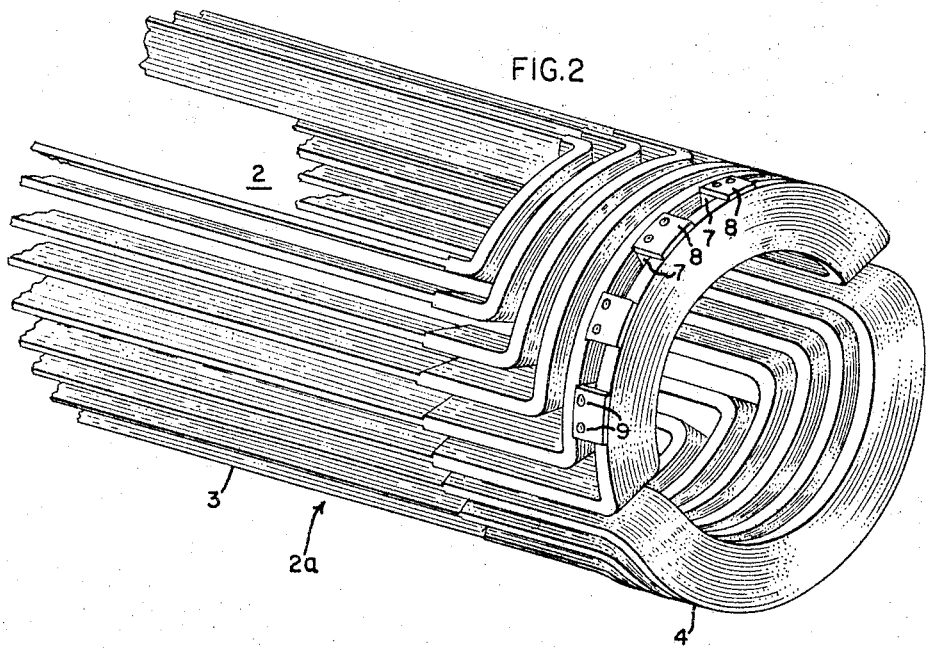
Figure 3:
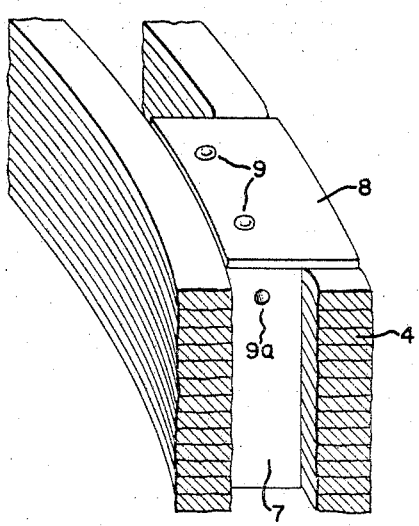
Figure 4:
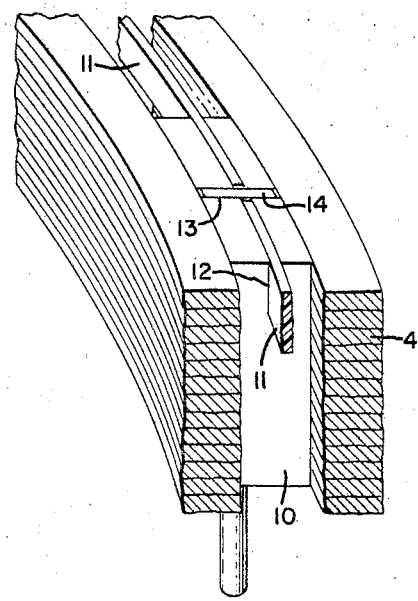
Figure 5:
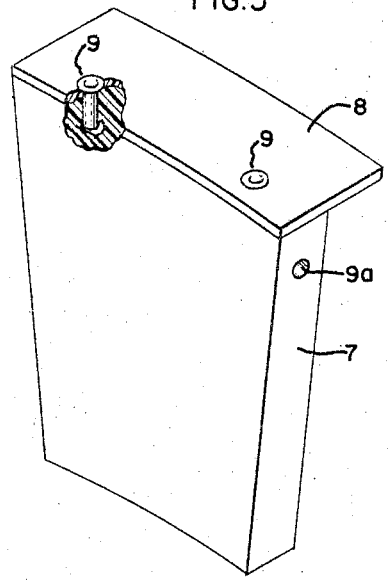

In the drawing:

FIG. 1 is a longitudinal view, partly in section, of the end of a generator rotor, FIG. 2 is a perspective view of the rotor windings which fit within the rotor part shown in FIG. 1, FIG. 3 is a perspective of a detail of FIG. 2 showing the blocking member of this invention, FIG. 4 is a perspective similar to FIG. 3 of a prior art blocking member, and FIG. 5 is a perspective view of the blocking member of this invention.

Referring now to FIGS. 1 and 2 of the drawing, a generator rotor body is shown at 1 which accommodates field windings generally indicated at 2 and comprising a series of coils 2a consisting of longitudinal or central windings 3 are set and locked into longitudinal slots of the rotor body indicated at 5. In the end portions, the end windings 4 are not similarly set into slots but are restrained from radial movement by a retaining ring 6 tightly fit over the windings at each end of the rotor. In addition, they are restrained from relative longitudinal movement by blocking members or spacer blocks 7 of dielectric material such as Textolite set between the end windings. Spacer blocks 7 are shown sparingly in FIGS. 1 and 2 but it will be understood that they will be set between the rotor end windings at appropriate intervals to block them apart. As shown in FIGS. 3 and 5, each spacer block 7 has a hook or flange 8 fastened as by pop rivets 9 to the radially outer end thereof. If rivets are used, an internal space must be provided for their expansion. Holes such as 9a can be provided for this purpose. Flange 8 is larger than the end surface to which it is fastened so as to overlap and hang on the adjacent end winding 4 as shown in FIG. 3. Thus it will be clear that this spacer block is easily inserted, is prevented from falling inwardly by the flange 8 and from moving outwardly or circumferentially when in operation, by the retaining ring 6 which tightly holds flanges 8 against windings 4. As will be seen in FIG. 3, initial rotation of the rotor causes the conductors to press against flange 8, thereby indenting the top conductor. This firmly locates the spacer and prevents it from moving circumferentially.

FIG. 4 shows an example of a prior art spacer block 10. Depending from the block 10 is a dowel which serves to keep the block from falling inwardly. The retaining ring holds the block 10 from radial outward movement but does not hold the block from circumferential movement as it does the spacer block of this invention. In order to hold block 10 in its peripheral location, a locking strip 11 is run along a keyway 12. Transverse keyways 13 are formed in blocks 10 to accommodate a key 14. Thus, with locking strip 11 keyed to each spacer block 10, the peripheral location of each block 10 is maintained. Block 10 thus requires the machining of longitudinal and transverse keyways, the addition of the depending dowel, and keys 11 and 14 for its assembly.

It will be apparent that the spacer block of this invention, with its riveted flange, is stable when in place, is relatively simple to produce and install, and more economical to produce and assembly than the prior art above described.

It will occur to others of skill in the art to make modifications of this invention which will remain with the concept and scope thereof and will not constitute patentable departure therefrom. Therefore, it is desired that this invention be not limited by the details in which it has been described but that it encompass all within the purview of the following claims.

What is claimed is:

1. A dynamoelectric machine rotor, said rotor containing windings with coils separated from one another in the rotor end portions by spacer blocks, a retaining ring surrounding the rotor end windings and holding them in place, said spacer blocks comprising a solid dielectric material between and substantially abutting the faces of spaced coils in the rotor end windings, a flange extending from each of said spacer blocks and substantially perpendicular to the faces of said blocks abutting said coils, said flange extending between the retaining ring and a radially outermost turn, whereby centrifugal force on the winding will ident the outermost turn around the flange to prevent it from moving along the coil.

References Cited

UNITED STATES PATENTS 2,844,746  7/1958  Coggeshall _____ 310—270 X
2,980,757  4/1961  Coggeshall et al. ____ 310—270 X

FOREIGN PATENTS 52,325  5/1910  Switzerland.

MILTON O. HIRSHFIELD, *Primary Examiner.*
A. G. COLLINS, *Assistant Examiner.*

U.S. Cl. X.R.

310—65, 194, 214, 270